US011374727B2

(12) United States Patent
Selvaganapathy et al.

(10) Patent No.: US 11,374,727 B2
(45) Date of Patent: Jun. 28, 2022

(54) METHODS AND APPARATUS FOR CONFIGURING TDD OPERATION OF A NARROWBAND INTERNET OF THINGS COMMUNICATIONS SYSTEM

(71) Applicant: NOKIA TECHNOLOGIES OY, Espoo (FI)

(72) Inventors: Srinivasan Selvaganapathy, Bangalore (IN); Muneender Chiranji, Hyderabad (IN)

(*) Notice: Subject to any disclaimer, the term of this patent is extended or adjusted under 35 U.S.C. 154(b) by 87 days.

(21) Appl. No.: 16/640,725

(22) PCT Filed: Jun. 7, 2018

(86) PCT No.: PCT/EP2018/064970
§ 371 (c)(1),
(2) Date: Feb. 20, 2020

(87) PCT Pub. No.: WO2019/037913
PCT Pub. Date: Feb. 28, 2019

(65) Prior Publication Data
US 2020/0186322 A1    Jun. 11, 2020

(30) Foreign Application Priority Data
Aug. 21, 2017   (IN) .............................. 201741029538

(51) Int. Cl.
H04W 56/00         (2009.01)
H04L 5/14          (2006.01)
(Continued)

(52) U.S. Cl.
CPC ........ *H04L 5/1469* (2013.01); *H04J 13/0062* (2013.01); *H04L 5/0007* (2013.01);
(Continued)

(58) Field of Classification Search
CPC . H04L 5/1469; H04L 13/0062; H04L 5/0007; H04L 5/0073; H04L 27/2607; H04W 72/0446
See application file for complete search history.

(56) References Cited

U.S. PATENT DOCUMENTS

2015/0189574 A1* 7/2015 Ng .................. H04W 24/08
                                            370/252
2017/0005848 A1* 1/2017 Zheng .............. H04W 56/001
(Continued)

FOREIGN PATENT DOCUMENTS

WO    2017136003 A1    8/2017
WO    2018026199 A1    2/2018

OTHER PUBLICATIONS

International Search Report and Written Opinion for International Application No. PCT/EP2018/064970, dated Nov. 15, 2018 (29 pages).
(Continued)

*Primary Examiner* — Sai Ming Chan
(74) *Attorney, Agent, or Firm* — Brake Hughes Bellermann LLP

(57) ABSTRACT

A method for configuring an access node to operate within a time division duplex communications system between the access node and at least one user equipment wherein the time division duplex communications system is a narrowband internet of things time division duplex communications system co-located with a long term evolution communications system network configured to switch a uplink and downlink configuration from frame to frame, the method comprising: generating a channel/signal, the channel/signal comprising information of a uplink and downlink configuration for communication between the access node and the at least one user equipment; mapping the channel/signal to at least one subframe period; and transmitting the channel/
(Continued)

signal to the at least one user equipment during the at least one subframe period, such that the channel/signal is received and used by the at least one user equipment to set a uplink and downlink configuration for communication between the access node and the at least one user equipment.

20 Claims, 12 Drawing Sheets

(51) Int. Cl.
  *H04J 13/00* (2011.01)
  *H04L 5/00* (2006.01)
  *H04L 27/26* (2006.01)
  *H04W 72/04* (2009.01)

(52) U.S. Cl.
  CPC ........ *H04L 5/0073* (2013.01); *H04L 27/2607* (2013.01); *H04W 72/0446* (2013.01)

(56) References Cited

U.S. PATENT DOCUMENTS

| | | | | |
|---|---|---|---|---|
| 2017/0134144 | A1* | 5/2017 | Lunttila | H04L 5/0073 |
| 2018/0145802 | A1* | 5/2018 | Hwang | H04W 72/0453 |
| 2018/0295007 | A1* | 10/2018 | Kumar | H04L 27/2613 |
| 2019/0173659 | A1* | 6/2019 | Liu | H04W 4/80 |
| 2020/0178172 | A1* | 6/2020 | Thangarasa | H04W 52/02 |

OTHER PUBLICATIONS

3GPP TSG RAN WG1 Meeting #90; R1-1713799; "Common Aspects of NB-IoT TDD Operation"; Prague, Czech Republic; Aug. 21-25, 2017; 5 pages.

Office Action for India Application No. 201741029538, dated Mar. 21, 2022, 7 pages.

* cited by examiner

| Uplink-downlink configuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

301 — Uplink-downlink configuration
303 — Downlink-to-Uplink Switch-point periodicity
305 — Subframe Number

Figure 3

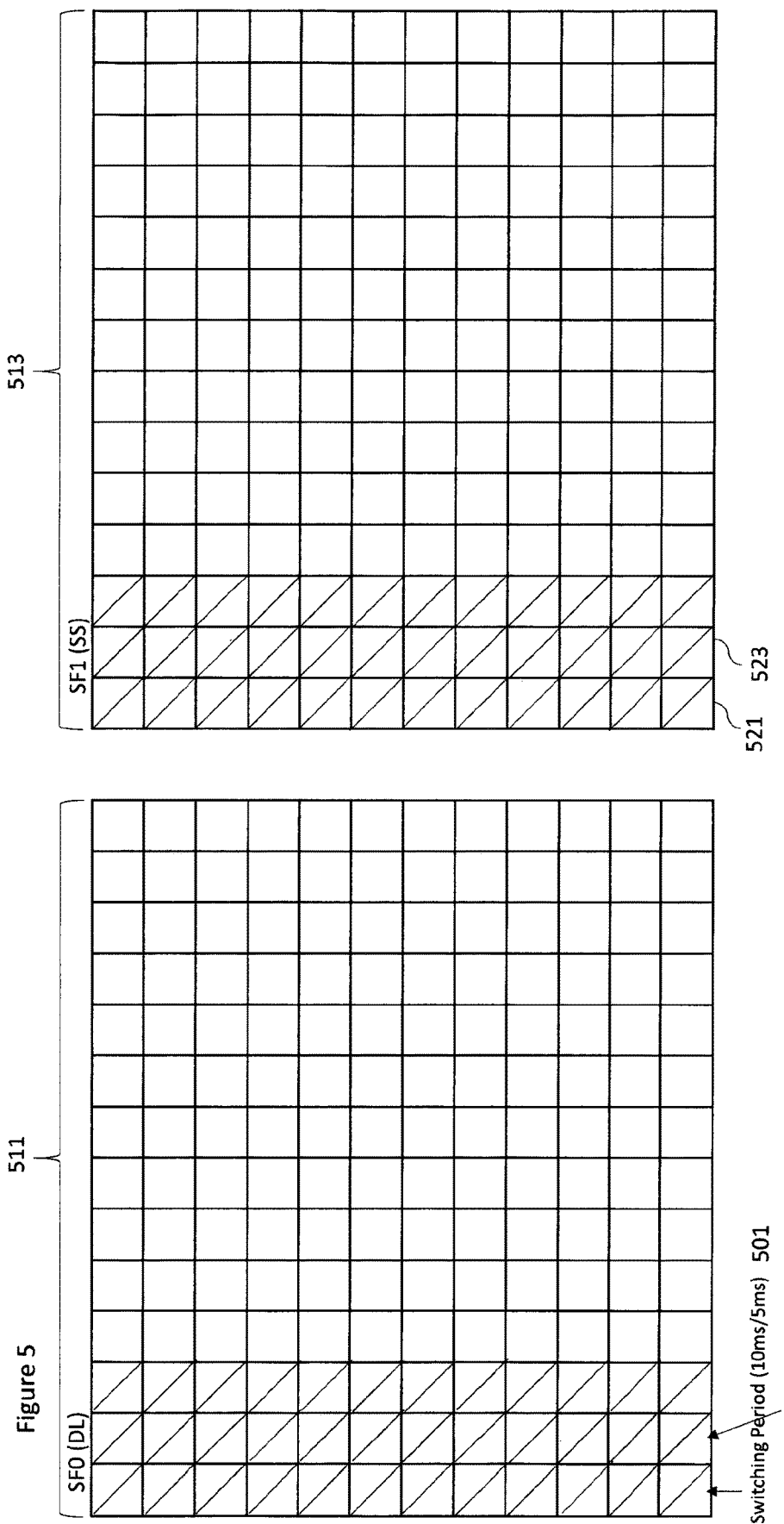

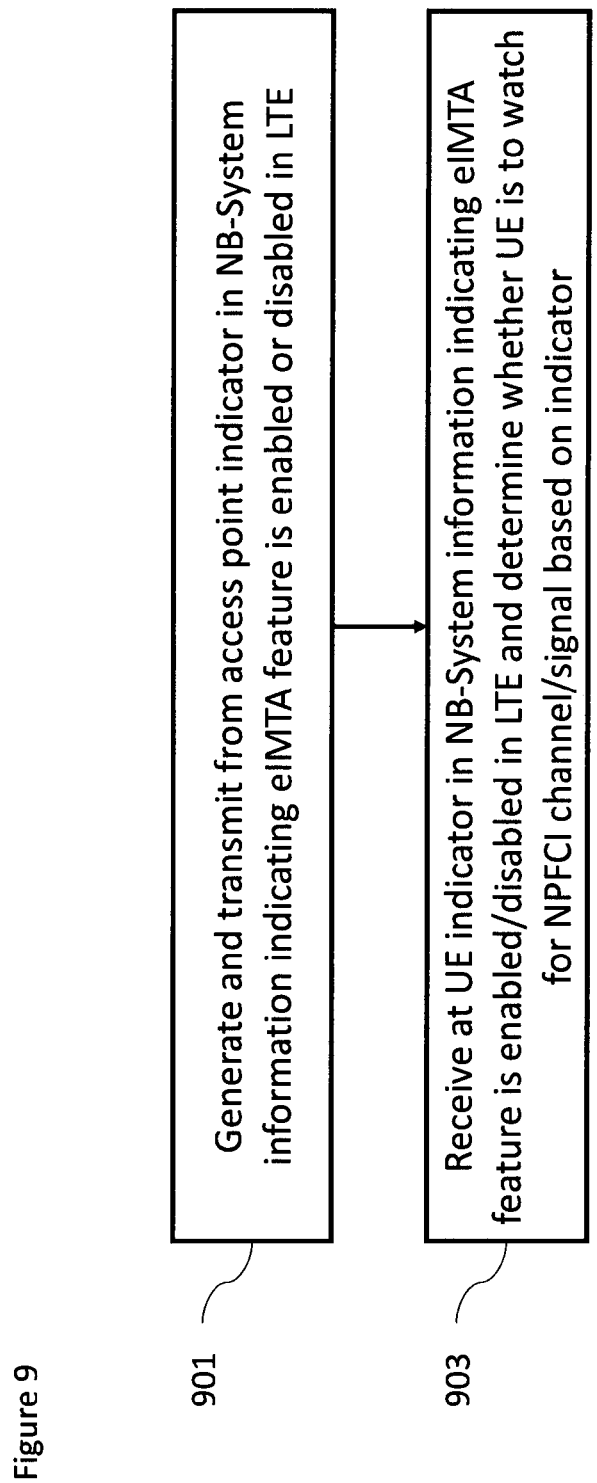

METHODS AND APPARATUS FOR CONFIGURING TDD OPERATION OF A NARROWBAND INTERNET OF THINGS COMMUNICATIONS SYSTEM

CROSS-REFERENCE TO RELATED APPLICATIONS

This application is a national stage entry of International Application No. PCT/EP2018/064970, filed Jun. 7, 2018, entitled "METHODS AND APPARATUS FOR CONFIGURING TDD OPERATION OF A NARROWBAND INTERNET OF THINGS COMMUNICATIONS SYSTEM" which claims the benefit of priority of Indian Application No. 201741029538, filed Aug. 21, 2017, both of which are hereby incorporated by reference in their entireties.

FIELD

The present application relates to a method, apparatus, and computer program and in particular but not exclusively to methods, apparatus, and computer programs related to narrowband internet of things (NB-IoT) based communications.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE) or mobile station (MS). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimising the 3GPP LTE radio access technologies. Another proposed communication system is a 5G network or a communication network which comprises enhancements for machine type communications or to support services for the Internet of Things. The deployed communication technologies of e.g., 3GPP GSM (Global Mobile System) and EGPRS (Edge Global Packet Radio System) or 3GPP LTE, may be enhanced to satisfy the specific requirements of the IoT services and their related user equipments or mobile stations, known as IoT devices. Those IoT devices may communicate via the radio link of the communication network to the service provider/server

SUMMARY

In a first aspect there is provided a method for configuring an access node to operate within a time division duplex communications system between the access node and at least one user equipment wherein the time division duplex communications system is a narrowband internet of things time division duplex communications system co-located with a long term evolution communications system network configured to switch a uplink and downlink configuration from frame to frame, the method comprising: generating a channel/signal, the channel/signal comprising information of a uplink and downlink configuration for communication between the access node and the at least one user equipment; mapping the channel/signal to at least one subframe period; and transmitting the channel/signal to the at least one user equipment during the at least one subframe period, such that the channel/signal is received and used by the at least one user equipment to set a uplink and downlink configuration for communication between the access node and the at least one user equipment.

The method may further comprise: defining at least two physical resource blocks, one of the at least two physical resource blocks deployed in a guard band of the time division duplex communications system and the others of the at least two physical resource blocks deployed in an inband of the time division duplex communications system, wherein transmitting the channel/signal to the at least one user equipment during the at least one subframe period may comprise transmitting the channel/signal to the at least one user equipment during the at least one subframe period repeated over the one of the at least two physical resource blocks deployed in the guard band.

The method may further comprise: defining a physical resource block deployed in a guard band of the time division duplex communications system, wherein transmitting the channel/signal to the at least one user equipment during the at least one subframe period may comprise transmitting the channel/signal to the at least one user equipment during the at least one subframe period repeated over the physical resource blocks deployed in the guard band.

Mapping the channel/signal to at least one subframe period may comprise at least one of: mapping the channel/signal to a first two orthogonal frequency division multiplexed symbols of a downlink subframe within a frame; mapping the channel/signal to a first three orthogonal frequency division multiplexed symbols of a downlink subframe within a frame; mapping the channel/signal to a first two orthogonal frequency division multiplexed symbols of a first special subframe within a frame; and mapping the channel/signal to a first three orthogonal frequency division multiplexed symbols of a first special subframe within a frame.

The method may further comprise: defining a physical resource block deployed in an inband of the time division duplex communications system, wherein transmitting the channel/signal to the at least one user equipment during the at least one subframe period may comprise transmitting the channel/signal to the at least one user equipment during the at least one subframe period repeated over the physical resource block deployed in the inband.

Mapping the channel/signal to at least one subframe period may comprise at least one of: mapping the channel/signal to a third and fourth orthogonal frequency division multiplexed symbols of a downlink pilot timeslot in a first special subframe; and mapping the channel/signal to a third to fifth orthogonal frequency division multiplexed symbols of a downlink pilot timeslot in a first special subframe.

The method may further comprise generating and broadcasting using a narrow band system information channel/signal information representing a signal condition threshold.

The method may further comprise generating and broadcasting using a narrow band system information channel/signal information representing whether an Enhanced Interference Mitigation & Traffic Adaptation mode is enabled in the long term evolution communications system network.

The channel/signal may comprise information of an uplink and downlink configuration for communication between the access node and the at least one user equipment comprises defining one of: a three bit indicator of the uplink and downlink configuration; and a two bit indicator of the uplink and downlink configuration.

The method may further comprise generating and broadcasting using a narrow band system information channel/signal information representing a number of bits used as an indicator of the uplink and downlink configuration.

Mapping the channel/signal to at least one subframe period may comprise one of: generating a Zadoff-Chu sequence of length 11 with two cyclic shifts to OFDM symbols, wherein a cyclic shift applied on each symbol represents 1 bit information; and generating a Zadoff-Chu sequence of length 22 or 33 with 6 cyclic shifts to OFDM symbols.

A method may comprise: determining whether the uplink and downlink configuration for communication between the access node and the at least one user equipment has changed since an earlier configuration broadcast using a narrow band system information channel/signal; performing the method as discussed herein, where the uplink and downlink configuration for communication between the access node and the at least one user equipment has changed; and allocating the capacity of the channel/signal to at least one other channel/signal where the uplink and downlink configuration for communication between the access node and the at least one user equipment has not changed.

According to a second aspect there is provided a method for configuring a user equipment to operate within a time division duplex communications system between an access node and the user equipment wherein the time division duplex communications system is a narrowband internet of things time division duplex communications system co-located with a long term evolution communications system network configured to switch a uplink and downlink configuration from frame to frame, the method comprising: receiving a channel/signal from the access node during at least one defined subframe period, the channel/signal comprising information of a uplink and downlink configuration for communication between the access node and the user equipment; and configuring the user equipment using the information of a uplink and downlink configuration for communication between the access node and the user equipment to set a uplink and downlink configuration for communication between the access node and the at least one user equipment.

The method may further comprise defining at least two physical resource blocks, one of the at least two physical resource blocks being deployed in a guard band of the time division duplex communications system and the others of the at least two physical resource blocks being deployed in an inband of the time division duplex communications system, wherein receiving a channel/signal from the access node during at least one defined subframe period may further comprise receiving a channel/signal from the access node during at least one defined subframe period repeated over the one of the at least two physical resource blocks being deployed in the guard band.

The method may further comprise defining a physical resource blocks being deployed in a guard band of the time division duplex communications system, wherein receiving a channel/signal from the access node during at least one defined subframe period may further comprise receiving a channel/signal from the access node during at least one defined subframe period repeated over the one of the at least two physical resource blocks being deployed in the guard band.

Receiving a channel/signal from the access node during at least one defined subframe period may comprise at least one of: receiving the channel/signal in a first two orthogonal frequency division multiplexed symbols of a downlink subframe within a frame; receiving the channel/signal in a first three orthogonal frequency division multiplexed symbols of a downlink subframe within a frame; receiving the channel/signal in a first two orthogonal frequency division multiplexed symbols of a first special subframe within a frame; and receiving the channel/signal in a first three orthogonal frequency division multiplexed symbols of a first special subframe within a frame.

The method may further comprise: defining a physical resource block deployed in an inband of the time division duplex communications system, wherein receiving the channel/signal to the at least one user equipment during the at least one subframe period may comprise receiving the channel/signal to the at least one user equipment during the at least one subframe period repeated over the physical resource block deployed in the inband.

Receiving a channel/signal from the access node during at least one defined subframe period may comprise at least one of: receiving the channel/signal in a third and fourth orthogonal frequency division multiplexed symbols of a downlink pilot timeslot in a first special subframe; and receiving the channel/signal to a third to fifth orthogonal frequency division multiplexed symbols of a downlink pilot timeslot in a first special subframe.

Receiving a channel/signal from the access node during at least one defined subframe period may comprise decoding from the channel/signal one of: a two bit indicator of the uplink and downlink configuration; a three bit indicator of the uplink and downlink configuration.

The method may further comprise receiving a narrow band system information channel/signal information representing a number of bits used as an indicator of the uplink and downlink configuration.

Receiving a channel/signal from the access node during at least one defined subframe period may comprises one of: decoding a Zadoff-Chu sequence of length 11 with two cyclic shifts to OFDM symbols, wherein a cyclic shift applied on each symbol represents 1 bit information; and decoding a Zadoff-Chu sequence of length 22 or 33 with 6 cyclic shifts to OFDM symbols.

The method may further comprise: receiving a narrow band system information channel/signal information representing an earlier uplink and downlink configuration for communication between the access node and the user equipment; determining for a further frame and during at least one defined subframe period of the further frame an absence of the channel/signal from the access node; and configuring the user equipment, for a frame succeeding the further frame, using the earlier uplink and downlink configuration for communication between the access node and the user equipment.

A method may comprise: receiving at an user equipment a narrow band system information channel/signal information representing a signal condition threshold; comparing a current signal condition and the signal condition threshold; performing the method for configuring the user equipment to operate within a time division duplex communications system between an access node and the user equipment as discussed herein where the current signal condition is better than the signal condition threshold; and configuring the user equipment to operate within the time division duplex communications system between an access node and the user equipment to set a uplink and downlink configuration for communication between the access node and the at least one user equipment which is not affected by any change in uplink and downlink configurations.

A method may comprise: receiving a narrow band system information channel/signal information representing whether an Enhanced Interference Mitigation & Traffic Adaptation mode is enabled in the long term evolution communications system network; performing the method for configuring the user equipment to operate within a time division duplex communications system between an access node and the user equipment as discussed herein where the narrow band system information channel/signal information represents the Enhanced Interference Mitigation & Traffic Adaptation mode is enabled.

A method for configuring a time division duplex communications system between an access node and at least one user equipment wherein the time division duplex communications system is be a narrowband internet of things time division duplex communications system co-located with a long term evolution communications system network, the method may comprise: the method for configuring a user equipment as discussed herein; and the method for configuring an access point as discussed herein.

According to a third aspect there is a provided an access node configured to operate within a time division duplex communications system between the access node and at least one user equipment wherein the time division duplex communications system is a narrowband internet of things time division duplex communications system co-located with a long term evolution communications system network configured to switch a uplink and downlink configuration from frame to frame, the access node configured to: generate a channel/signal, the channel/signal comprising information of a uplink and downlink configuration for communication between the access node and the at least one user equipment; map the channel/signal to at least one subframe period; and transmit the channel/signal to the at least one user equipment during the at least one subframe period, such that the channel/signal is received and used by the at least one user equipment to set a uplink and downlink configuration for communication between the access node and the at least one user equipment.

The access node may further be configured to: define at least two physical resource blocks, one of the at least two physical resource blocks deployed in a guard band of the time division duplex communications system and the others of the at least two physical resource blocks deployed in an inband of the time division duplex communications system, wherein transmitting the channel/signal to the at least one user equipment during the at least one subframe period may cause the access node to be configured to transmit the channel/signal to the at least one user equipment during the at least one subframe period repeated over the one of the at least two physical resource blocks deployed in the guard band.

The access node may be further configured to: define a physical resource block deployed in a guard band of the time division duplex communications system, wherein transmitting the channel/signal to the at least one user equipment during the at least one subframe period may cause the access node to be configured to transmit the channel/signal to the at least one user equipment during the at least one subframe period repeated over the physical resource blocks deployed in the guard band.

Mapping the channel/signal to at least one subframe period may cause the access node to be configured to perform at least one of: map the channel/signal to a first two orthogonal frequency division multiplexed symbols of a downlink subframe within a frame; map the channel/signal to a first three orthogonal frequency division multiplexed symbols of a downlink subframe within a frame; map the channel/signal to a first two orthogonal frequency division multiplexed symbols of a first special subframe within a frame; and map the channel/signal to a first three orthogonal frequency division multiplexed symbols of a first special subframe within a frame.

The access node may be further configured to: define a physical resource block deployed in an inband of the time division duplex communications system, wherein transmitting the channel/signal to the at least one user equipment during the at least one subframe period may cause the access node to be configured to transmit the channel/signal to the at least one user equipment during the at least one subframe period repeated over the physical resource block deployed in the inband.

Mapping the channel/signal to at least one subframe period may cause the access node to be configured to perform at least one of: map the channel/signal to a third and fourth orthogonal frequency division multiplexed symbols of a downlink pilot timeslot in a first special subframe; and map the channel/signal to a third to fifth orthogonal frequency division multiplexed symbols of a downlink pilot timeslot in a first special subframe.

The access node may further be configured to generate and broadcast using a narrow band system information channel/signal information representing a signal condition threshold.

The access node may further be configured to generate and broadcast using a narrow band system information channel/signal information representing whether an Enhanced Interference Mitigation & Traffic Adaptation mode is enabled in the long term evolution communications system network.

The channel/signal may comprise information of an uplink and downlink configuration for communication between the access node and the at least one user equipment comprises one of: a three bit indicator of the uplink and downlink configuration; and a two bit indicator of the uplink and downlink configuration.

The access node may be configured to generate and broadcast using a narrow band system information channel/signal information representing a number of bits used as an indicator of the uplink and downlink configuration.

Mapping the channel/signal to at least one subframe period may cause the access node to be configured to perform one of: generate a Zadoff-Chu sequence of length 11 with two cyclic shifts to OFDM symbols, wherein a cyclic shift applied on each symbol represents 1 bit information; and generate a Zadoff-Chu sequence of length 22 or 33 with 6 cyclic shifts to OFDM symbols.

The access node may be configured to: determine whether the uplink and downlink configuration for communication between the access node and the at least one user equipment has changed since an earlier configuration broadcast using a narrow band system information channel/signal; perform as discussed herein, where the uplink and downlink configuration for communication between the access node and the at least one user equipment has changed; and allocate the capacity of the channel/signal to at least one other channel/signal where the uplink and downlink configuration for communication between the access node and the at least one user equipment has not changed.

According to a fourth aspect there is provided a user equipment configured to operate within a time division duplex communications system between an access node and the user equipment wherein the time division duplex communications system is a narrowband internet of things time division duplex communications system co-located with a long term evolution communications system network configured to switch a uplink and downlink configuration from frame to frame, the user equipment configured to: receive a channel/signal from the access node during at least one defined subframe period, the channel/signal comprising information of a uplink and downlink configuration for communication between the access node and the user equipment; and configure the user equipment using the information of a uplink and downlink configuration for communication between the access node and the user equipment to set a uplink and downlink configuration for communication between the access node and the at least one user equipment.

The user equipment may be further configured to define at least two physical resource blocks, one of the at least two physical resource blocks being deployed in a guard band of the time division duplex communications system and the others of the at least two physical resource blocks being deployed in an inband of the time division duplex communications system, wherein receiving a channel/signal from the access node during at least one defined subframe period may cause the user equipment to be configured to receive a channel/signal from the access node during at least one defined subframe period repeated over the one of the at least two physical resource blocks being deployed in the guard band.

The user equipment may further be configured to define a physical resource block being deployed in a guard band of the time division duplex communications system, wherein receiving a channel/signal from the access node during at least one defined subframe period may cause the user equipment to be configured to receive a channel/signal from the access node during at least one defined subframe period repeated over the one of the at least two physical resource blocks being deployed in the guard band.

Receiving a channel/signal from the access node during at least one defined subframe period may cause the user equipment to be configured to at least one of: receive the channel/signal in a first two orthogonal frequency division multiplexed symbols of a downlink subframe within a frame; receive the channel/signal in a first three orthogonal frequency division multiplexed symbols of a downlink subframe within a frame; receive the channel/signal in a first two orthogonal frequency division multiplexed symbols of a first special subframe within a frame; and receive the channel/signal in a first three orthogonal frequency division multiplexed symbols of a first special subframe within a frame.

The user equipment may further be configured to: define a physical resource block deployed in an inband of the time division duplex communications system, wherein receiving the channel/signal to the at least one user equipment during the at least one subframe period may cause the user equipment to be configured to receive the channel/signal to the at least one user equipment during the at least one subframe period repeated over the physical resource block deployed in the inband.

Receiving a channel/signal from the access node during at least one defined subframe period may cause the user equipment to be configured to perform at least one of: receive the channel/signal in a third and fourth orthogonal frequency division multiplexed symbols of a downlink pilot timeslot in a first special subframe; and receive the channel/signal to a third to fifth orthogonal frequency division multiplexed symbols of a downlink pilot timeslot in a first special subframe.

Receiving a channel/signal from the access node during at least one defined subframe period may cause the user equipment to be configured to decode from the channel/signal one of: a two bit indicator of the uplink and downlink configuration; a three bit indicator of the uplink and downlink configuration.

The user equipment may further be configured to receive a narrow band system information channel/signal information representing a number of bits used as an indicator of the uplink and downlink configuration.

Receiving a channel/signal from the access node during at least one defined subframe period may cause the user equipment to be configured to perform one of: decoding a Zadoff-Chu sequence of length 11 with two cyclic shifts to OFDM symbols, wherein a cyclic shift applied on each symbol represents 1 bit information; and decoding a Zadoff-Chu sequence of length 22 or 33 with 6 cyclic shifts to OFDM symbols.

The user equipment may further be configured to: receive a narrow band system information channel/signal information representing an earlier uplink and downlink configuration for communication between the access node and the user equipment; determining for a further frame and during at least one defined subframe period of the further frame an absence of the channel/signal from the access node; and configure the user equipment, for a frame succeeding the further frame, using the earlier uplink and downlink configuration for communication between the access node and the user equipment.

A user equipment may be configured to: receive at an user equipment a narrow band system information channel/signal information representing a signal condition threshold; comparing a current signal condition and the signal condition threshold; configure the user equipment to operate within a time division duplex communications system between an access node and the user equipment as discussed herein where the current signal condition is better than the signal condition threshold; and configure the user equipment to operate within the time division duplex communications system between an access node and the user equipment to set a uplink and downlink configuration for communication between the access node and the at least one user equipment which is not affected by any change in uplink and downlink configurations.

A user equipment may be configured to: receive a narrow band system information channel/signal information representing whether an Enhanced Interference Mitigation & Traffic Adaptation mode is enabled in the long term evolution communications system network; and configure the user equipment to operate within a time division duplex communications system between an access node and the user equipment as discussed herein where the narrow band system information channel/signal information represents the Enhanced Interference Mitigation & Traffic Adaptation mode is enabled.

A system configured to configure a time division duplex communications system between an access node and at least one user equipment wherein the time division duplex communications system is be a narrowband internet of things time division duplex communications system co-located with a long term evolution communications system network, the system may comprise: the user equipment as discussed herein; and the access point as discussed herein.

The time division duplex communications system may be one of: an inband deployed narrowband time division duplex communications system; and a guardband deployed narrowband time division duplex communications system.

According to another aspect there is a provided an apparatus in an access node configured to operate within a time division duplex communications system between the access node and at least one user equipment wherein the time division duplex communications system is a narrowband internet of things time division duplex communications system co-located with a long term evolution communications system network configured to switch a uplink and downlink configuration from frame to frame, the apparatus configured to: generate a channel/signal, the channel/signal comprising information of a uplink and downlink configuration for communication between the access node and the at least one user equipment; map the channel/signal to at least one subframe period; and cause the channel/signal to be transmitted to the at least one user equipment during the at least one subframe period, such that the channel/signal is received and used by the at least one user equipment to set a uplink and downlink configuration for communication between the access node and the at least one user equipment.

The apparatus may further be configured to: define at least two physical resource blocks, one of the at least two physical resource blocks deployed in a guard band of the time division duplex communications system and the others of the at least two physical resource blocks deployed in an inband of the time division duplex communications system, wherein transmitting the channel/signal to the at least one user equipment during the at least one subframe period may cause the access node to be configured to transmit the channel/signal to the at least one user equipment during the at least one subframe period repeated over the one of the at least two physical resource blocks deployed in the guard band.

The apparatus may be further configured to: define a physical resource block deployed in a guard band of the time division duplex communications system, wherein transmitting the channel/signal to the at least one user equipment during the at least one subframe period may cause the access node to be configured to transmit the channel/signal to the at least one user equipment during the at least one subframe period repeated over the physical resource blocks deployed in the guard band.

Mapping the channel/signal to at least one subframe period may cause the access node to be configured to perform at least one of: map the channel/signal to a first two orthogonal frequency division multiplexed symbols of a downlink subframe within a frame; map the channel/signal to a first three orthogonal frequency division multiplexed symbols of a downlink subframe within a frame; map the channel/signal to a first two orthogonal frequency division multiplexed symbols of a first special subframe within a frame; and map the channel/signal to a first three orthogonal frequency division multiplexed symbols of a first special subframe within a frame.

The apparatus may be further configured to: define a physical resource block deployed in an inband of the time division duplex communications system, wherein transmitting the channel/signal to the at least one user equipment during the at least one subframe period may cause the access node to be configured to transmit the channel/signal to the at least one user equipment during the at least one subframe period repeated over the physical resource block deployed in the inband.

Mapping the channel/signal to at least one subframe period may cause the access node to be configured to perform at least one of: map the channel/signal to a third and fourth orthogonal frequency division multiplexed symbols of a downlink pilot timeslot in a first special subframe; and map the channel/signal to a third to fifth orthogonal frequency division multiplexed symbols of a downlink pilot timeslot in a first special subframe.

The apparatus may further be configured to generate and broadcast using a narrow band system information channel/signal information representing a signal condition threshold.

The apparatus may further be configured to generate and broadcast using a narrow band system information channel/signal information representing whether an Enhanced Interference Mitigation & Traffic Adaptation mode is enabled in the long term evolution communications system network.

The channel/signal may comprise information of an uplink and downlink configuration for communication between the access node and the at least one user equipment comprises one of: a three bit indicator of the uplink and downlink configuration; and a two bit indicator of the uplink and downlink configuration.

The apparatus may be configured to cause the access node to generate and broadcast using a narrow band system information channel/signal information representing a number of bits used as an indicator of the uplink and downlink configuration.

Mapping the channel/signal to at least one subframe period may cause the access node to be configured to perform one of: generate a Zadoff-Chu sequence of length 11 with two cyclic shifts to OFDM symbols, wherein a cyclic shift applied on each symbol represents 1 bit information; and generate a Zadoff-Chu sequence of length 22 or 33 with 6 cyclic shifts to OFDM symbols.

The apparatus may be configured to: determine whether the uplink and downlink configuration for communication between the access node and the at least one user equipment has changed since an earlier configuration broadcast using a narrow band system information channel/signal; perform as discussed herein, where the uplink and downlink configuration for communication between the access node and the at least one user equipment has changed; and allocate the capacity of the channel/signal to at least one other channel/signal where the uplink and downlink configuration for communication between the access node and the at least one user equipment has not changed.

The apparatus may comprise at least one processor and at least one memory including computer code for one or more programs.

According to another aspect there is provided an apparatus in a user equipment configured to operate within a time division duplex communications system between an access node and the user equipment wherein the time division duplex communications system is a narrowband internet of things time division duplex communications system co-located with a long term evolution communications system network configured to switch a uplink and downlink configuration from frame to frame, the apparatus configured to: receive a channel/signal from the access node during at least one defined subframe period, the channel/signal comprising information of a uplink and downlink configuration for communication between the access node and the user equipment; and configure the user equipment using the information of a uplink and downlink configuration for communication between the access node and the user equipment to set a uplink and downlink configuration for communication between the access node and the at least one user equipment.

The apparatus may be further configured to define at least two physical resource blocks, one of the at least two physical resource blocks being deployed in a guard band of the time division duplex communications system and the others of the at least two physical resource blocks being deployed in an inband of the time division duplex communications system, wherein receiving a channel/signal from the access node during at least one defined subframe period may cause the apparatus to configure the user equipment to receive a channel/signal from the access node during at least one defined subframe period repeated over the one of the at least two physical resource blocks being deployed in the guard band.

The apparatus may further be configured to define a physical resource block being deployed in a guard band of the time division duplex communications system, wherein receiving a channel/signal from the access node during at least one defined subframe period may cause the apparatus to configure the user equipment to receive a channel/signal from the access node during at least one defined subframe period repeated over the one of the at least two physical resource blocks being deployed in the guard band.

Receiving a channel/signal from the access node during at least one defined subframe period may cause the apparatus to configure the user equipment to at least one of: receive the channel/signal in a first two orthogonal frequency division multiplexed symbols of a downlink subframe within a frame; receive the channel/signal in a first three orthogonal frequency division multiplexed symbols of a downlink subframe within a frame; receive the channel/signal in a first two orthogonal frequency division multiplexed symbols of a first special subframe within a frame; and receive the channel/signal in a first three orthogonal frequency division multiplexed symbols of a first special subframe within a frame.

The apparatus may further be configured to: define a physical resource block deployed in an inband of the time division duplex communications system, wherein receiving the channel/signal to the at least one user equipment during the at least one subframe period may cause the apparatus to configure the user equipment to receive the channel/signal to the at least one user equipment during the at least one subframe period repeated over the physical resource block deployed in the inband.

Receiving a channel/signal from the access node during at least one defined subframe period may cause the apparatus to configure the user equipment to perform at least one of: receive the channel/signal in a third and fourth orthogonal frequency division multiplexed symbols of a downlink pilot timeslot in a first special subframe; and receive the channel/signal to a third to fifth orthogonal frequency division multiplexed symbols of a downlink pilot timeslot in a first special subframe.

Receiving a channel/signal from the access node during at least one defined subframe period may cause the apparatus to configure the user equipment to decode from the channel/signal one of: a two bit indicator of the uplink and downlink configuration; a three bit indicator of the uplink and downlink configuration.

The apparatus may further be configured to receive a narrow band system information channel/signal information representing a number of bits used as an indicator of the uplink and downlink configuration.

Receiving a channel/signal from the access node during at least one defined subframe period may cause the apparatus to configure the user equipment to perform one of: decoding a Zadoff-Chu sequence of length 11 with two cyclic shifts to OFDM symbols, wherein a cyclic shift applied on each symbol represents 1 bit information; and decoding a Zadoff-Chu sequence of length 22 or 33 with 6 cyclic shifts to OFDM symbols.

The apparatus may further be configured to: receive a narrow band system information channel/signal information representing an earlier uplink and downlink configuration for communication between the access node and the user equipment; determining for a further frame and during at least one defined subframe period of the further frame an absence of the channel/signal from the access node; and configure the user equipment, for a frame succeeding the further frame, using the earlier uplink and downlink configuration for communication between the access node and the user equipment.

The apparatus may comprise at least one processor and at least one memory including computer code for one or more programs.

An apparatus in a user equipment may be configured to: receive at an user equipment a narrow band system information channel/signal information representing a signal condition threshold; comparing a current signal condition and the signal condition threshold; configure the user equipment to operate within a time division duplex communications system between an access node and the user equipment as discussed herein where the current signal condition is better than the signal condition threshold; and configure the user equipment to operate within the time division duplex communications system between an access node and the user equipment to set a uplink and downlink configuration for communication between the access node and the at least one user equipment which is not affected by any change in uplink and downlink configurations.

An apparatus in a user equipment may be configured to: receive a narrow band system information channel/signal information representing whether an Enhanced Interference Mitigation & Traffic Adaptation mode is enabled in the long term evolution communications system network; and configure the user equipment to operate within a time division duplex communications system between an access node and the user equipment as discussed herein where the narrow band system information channel/signal information represents the Enhanced Interference Mitigation & Traffic Adaptation mode is enabled.

The apparatus may comprise at least one processor and at least one memory including computer code for one or more programs.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 3 shows an example table of known narrow band internet of things (NB-IoT) uplink/downlink (UL/DL) time division duplex (TDD) configurations;

FIG. 5 shows an example sub-frame structure suitable for implementing signalling of dynamic switching of narrow band internet of things (NB-IoT) uplink/downlink (UL/DL) time division duplex (TDD) configurations according to some embodiments;

FIG. 9 shows a flow diagram of a further aspect of indicating the signalling of dynamic switching according to some embodiments.

DETAILED DESCRIPTION

Before explaining in detail the examples, certain general principles of a wireless communication system and mobile communication devices are briefly explained with reference to FIGS. 1, 2a and 2b to assist in understanding the technology underlying the described examples.

Figure 1:
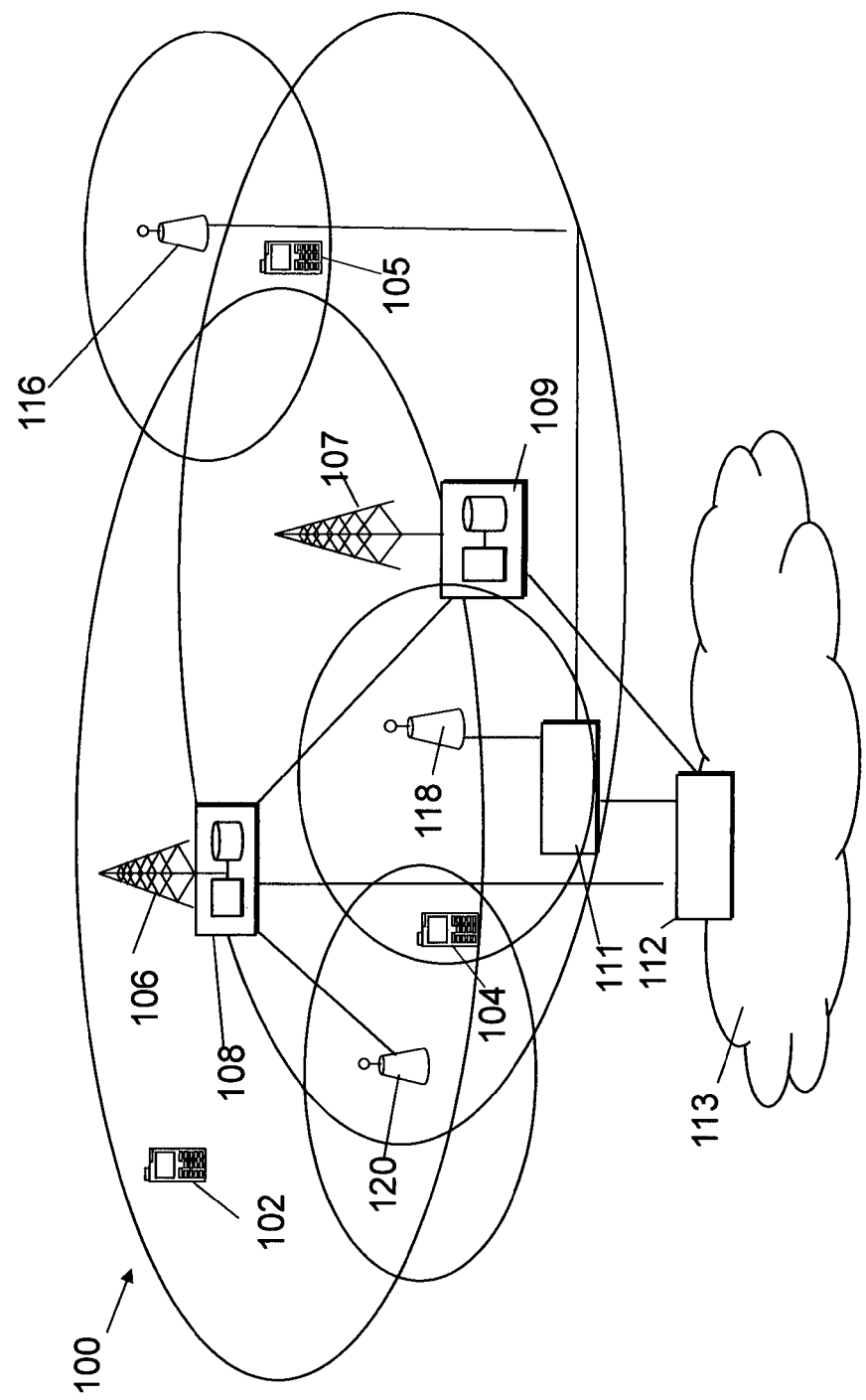
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations (BTS, NodeB (NB), enhanced NodeB (eNB) are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller (RNC). In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller or a base station controller (BSC).

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2A:
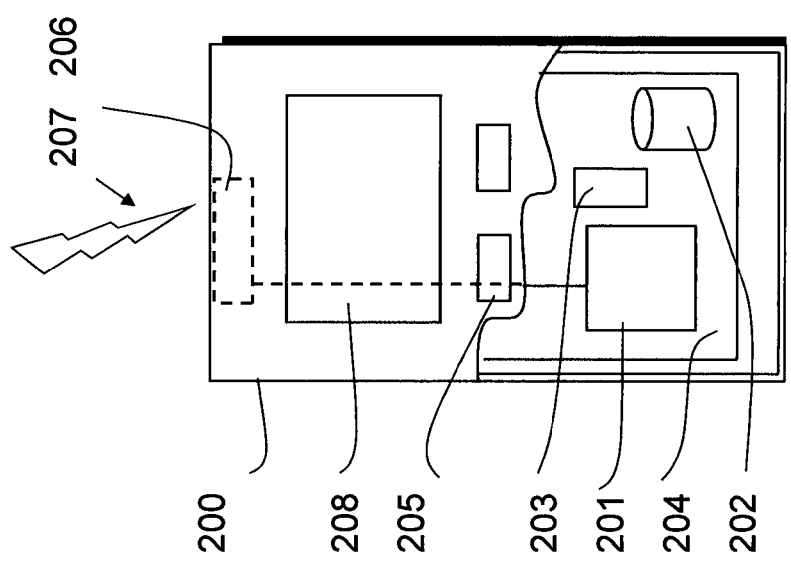
FIG. 2a shows a schematic diagram of an example mobile communication device.

A possible mobile communication device will now be described in more detail with reference to FIG. 2a showing a schematic, partially sectioned view of a communication device 200. Such a communication device is often referred to as user equipment (UE), mobile station (MS) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, an IoT device or any combinations of these or the like. The term "mobile station", may also cover any such device configured for movement, e.g. a mobile IoT device. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving (e.g., a receiver) and may transmit signals via appropriate apparatus for transmitting radio signals (e.g., a transmitter). In FIG. 2a transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 2B:
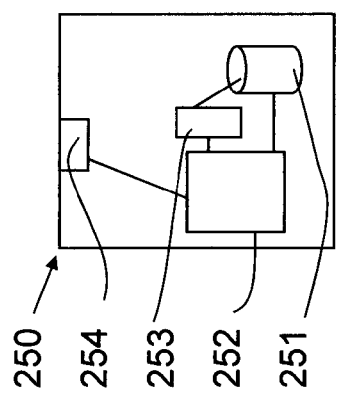
FIG. 2b shows a schematic diagram of an example control apparatus.

FIG. 2b shows an example of a control apparatus for a communication system, for example to be coupled to and/or for controlling a station of an access system, such as a RAN node, e.g. a base station, (e)node B or 5G AP, a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 250 can be arranged to provide control on communications in the service area of the system. The control apparatus 250 comprises at least one memory 251, at least one data processing unit 252, 253 and an input/output interface 254. Via the interface the control apparatus can be coupled to a receiver and a transmitter of the base station. The receiver and/or the transmitter may be implemented as a radio front end or a remote radio head. For example the control apparatus 250 or processor 251 can be configured to execute an appropriate software code to provide the control functions.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on. Signalling mechanisms and procedures, which may enable a device to address in-device coexistence (IDC) issues caused by multiple transceivers, may be provided with help from the LTE network. The multiple transceivers may be configured for providing radio access to different radio technologies.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile network architecture known as the Evolved Universal Terrestrial Radio Access Network (E-UTRAN). Base stations or access nodes of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of a radio access system comprise those provided by base stations of systems that are based on technologies such as wireless local area network (WLAN) and/or WiMax (Worldwide Interoperability for Microwave Access). A base station can provide coverage for an entire cell or similar radio service area.

Machine type communication is expected to provide significant growth opportunities in the 3GPP ecosystem. Of various applications of Machine type communication (MTC) or IoT (Internet of things), and/or cellular IOT (CIOT), one application may be the deployment of low cost low throughput devices in extended coverage conditions. This application may be suitable for sensors or smart meters deployed in basement or indoor coverage conditions.

Support of ultra low complexity Internet of Things in cellular networks is introduced in 3GPP Rel-13. The key objectives of the Cellular IoT for low complexity devices are increased battery life time, extended coverage and support of massive number of devices per cell. An example of a technology introduced in 3GPP which work in narrow spectrum of 200 kHz is narrowband Internet of things (NB-IoT).

Enhancing the functionality of NB-IoT is a goal many are attempting to achieve. For example support for NB-IoT time division duplex (TDD) communications, which is required for some specific operator deployments where only TDD deployments are possible, has been recently been agreed. Moreover without implementing a NB-IoT functionality extended for TDD configuration it is not possible to introduce support for IoT wherever a LTE-TDD network is deployed.

The uplink/downlink (UL/DL) configuration for LTE-TDD defines a subframe allocation for uplink and downlink within a radio frame of 10 msec. In the current configurations a special subframe S is introduced whenever the transmission switches from downlink D to uplink U. The special subframe S provides the guard period for an UE to receive the last downlink symbol and switch to uplink and start transmission earlier so that the uplink signal reaches an eNB at the next UL subframe. The guard period also provides protection from downlink interference from neighbouring cells with a larger propagation delay to the next uplink transmissions.

For example with respect to FIG. 3a is shown a table which lists the possible UL/DL configurations each having different number of subframes allocated for uplink and downlink. The table shows a first column 301 of the UL/DL configuration value (0 to 6), a second column 303 defining the DL to UL switch point periodicity (either 5 ms or 10 ms), a third column 305 which shows for the subframes 0 to 9 whether the configuration defines the subframe as an downlink (D), uplink (U) or special (S) subframe. According to such configurations a minimum number of DL subframes is 2 (configuration 0) and maximum number of DL subframes is 8 (configuration 5).

As per the frame mapping for NB-IoT frequency division duplex (FDD) configurations a Primary Synchronization Signal is mapped onto subframe 5 in every radio frame, a Secondary Synchronization Signal is mapped onto subframe 9 in every even numbered radio frame, the broadcast channel (NPBCH) is mapped onto subframe 0. Furthermore the narrowband-system information block 1, NB-SIB1, which provides information on cell access and selection and other system information block scheduling is scheduled on subframe 4 with the repetitions as indicated in NPBCH with periodicity of 1280 msec. Furthermore narrowband physical downlink control channel (NPDCCH)/narrowband physical downlink shared channel (NPDSCH) transmission happens in the remaining subframes. Narrowband physical uplink shared channel (NPUSCH) and Narrowband physical random access channel (NPRACH) transmission happens in all uplink subframes.

One of the current research objectives is the definition of NB-IOT TDD operation for all deployment modes ensuring common design across all the modes. Many of the LTE TDD systems supports dynamic switching of the UL/DL configuration such as shown above across radio frames which enables adaptation of downlink and uplink resource split according to interference and traffic load conditions. This feature is known as Enhanced Interference Mitigation & Traffic Adaptation (eIMTA) for LTE-TDD.

The UL/DL configuration information of an LTE cell is included in system information message so that UE which camps onto the cell knows the UL/DL configuration as part of system acquisition. When UL/DL configuration is to be changed in a cell, for example in order to adapt to an interference and/or loading condition, a change of the configuration sent via system information will take a relatively long time as the modification needs to be informed through system information messages for periods which correspond to a system information modification period. In order to adapt the UL/DL configuration in a faster manner a new feature has been introduced. This feature is implemented as the UL/DL configuration is informed to a UE via a physical downlink control channel (PDCCH) signal using eIMTA-RNTI during a switching period which has maximum duration of 80 msec.

When NB-IoT is introduced as an inband physical resource block (PRB) with LTE TDD where the dynamic UL/DL switching is supported, informing UL/DL configuration switching via NPDCCH is not possible due to several reasons. Firstly NB-IoT common channels need to be transmitted on the fixed downlink subframes, which do not have additional resources for further signals to inform the UL/DL configuration for switching. Secondly in case where NPDCCH is multiplexed on one of the DL subframe with Narrowband Primary Synchronisation Sequence (NSSS), it is only possible to communicate the changes for alternative DL radio frames. Moreover, even if the NPDCCH for UL/DL configuration could be communicated, it reduces the NPDCCH resources for other transmissions. As more frequent updates are needed, informing the UL/DL configuration via NPDCCH which has a defined search space is not suitable for this purpose.

Therefore the following disclosure focusses on a different solution than informing the dynamic switching via NPDCCH for NB-IoT TDD interworking with dynamic TDD switching at LTE for inband operations.

In some circumstances a solution to allow dynamic switching of UL/DL configuration at LTE without impacting the NB-IoT TDD operation may be to limit the NB-IoT operations to the minimum UL/DL configurations which are not impacted by the dynamic switching. For example NB-IoT physical resources in DL may be limited only to the first subframe (SF0) and the sixth subframe (SF5) and uplink resources are limited only to the UL subframe following the first special subframe. However this option restricts the overall resources available for NB-IoT operations to significantly lower number than is possible when non-dynamic switching is implemented and also therefore significantly impacts the capacity of the NB-IoT system.

Thus the concept as discussed in further detail hereafter is one where a system and methods enable dynamic switching at LTE where NB-IoT is to be deployed as an inband system. The system in such embodiments is configured to define more than one physical resource block (PRB) for NB-IoT TDD with an anchor PRB deployed in a guard band. Furthermore the system and methods are configured to define a channel/signal which contains 3-bit information for the UL/DL configuration. This channel may in some embodiments be called a N-Packet Frame Configuration Indication (NPFCI) channel or signal. In some embodiments the NPFCI is mapped to the first ⅔ OFDM symbols of DL frame SF0 or SF5 and also on the same OFDM symbols in the first special subframe. In such a manner there are 3 repetitions within the same frame, which increases the probability of reception for most IoT devices. Furthermore the channel in some embodiments is repeated in all the radio frames corresponding to the switching period of the corresponding LTE TDD cell. In such embodiments the NB-IoT UE may be configured to first decode this channel/signal to know the UL/DL configuration of next window and then apply the corresponding UL/DL configuration for accessing the cell.

The concept thus in these embodiments allows a UE which is within a sufficiently good coverage condition to be able to decode the new channel based on the available repetitions and apply the dynamic configuration. If the UE is in a poorer coverage area than the coverage condition (or coverage threshold), the UE/eNB limits its uplink and downlink resources to the fixed uplink and downlink subframes (as described above) only. Although only UEs in the sufficiently good coverage condition up to the threshold or specific level benefit from the dynamic UL/DL configuration, the system provides reasonable benefits for NB-IoT TDD devices in the cell because the number of devices in poor or extreme coverage conditions is expected to be within 10% of the total number of devices. Thus 90% of the IoT devices will benefit from this proposed solution.

In summary the concept can be defined by two related methods, method 1 and method 2.

Method 1 defines a method for an anchor PRB on guard band with a new channel/signal on first ⅔ OFDM symbols of some of the downlink/special subframes.

In method 1 the new physical control channel/signal on the anchor carrier on allocated on the guard band indicates the UL/DL configuration of a set of radio frames which is applicable for all PRBs including the anchor NB-IoT PRBs. Furthermore with respect to method 1 the contents of the new physical layer control channel of NB-IOT TDD is configured to carry the same information as the DCI sent in LTE using eIMTA-RNTI. Furthermore in this method where the NB-System information indicates a threshold or defined value above which the UE should refer to the NPFCI channel in order to receive and determine the UL/DL configuration of the next set of radio frames. In some embodiments of method 1 where the UL/DL configuration remains same as the reference configuration indicated in system information the new channel is not sent in these symbols. In this case these symbols can be used for sending other channels. Furthermore in some embodiments if the eIMTA feature is disabled/enabled in LTE, an indication can be given in NB-System Information, so that UE is configured to stop receiving the channel/signal or start receiving and decoding the channel signal. Thus in some embodiments the UE is configured to decode the new channel to understand the UL/DL configuration of subsequent radio frame if its downlink coverage condition is above the threshold broadcasted in NB-SIB.

Method 2 defines the a method for an PRB on inband with a new channel/signal indicating the UL/DL configuration being mapped to some OFDM symbols of the special subframe. In such embodiments the channel/signals indicating the UL/DL configuration are mapped to a 3rd and 4th (or even 5th if needed) OFDM symbols of a Downlink Pilot Timeslot (DwPTS) of the special subframe. These embodiments are applicable for many of the special subframe configurations such as 1-4 and 6-10 which are have more than 3 OFDM symbols in DwPTS.

Furthermore in some embodiments where the UL/DL configuration remains same as the reference configuration indicated in system information the new channel is not sent in these symbols. In this case these symbols can be used for sending other channels or signals. Furthermore similar to that shown in method 1 where the eIMTA feature is disabled or enables in LTE, an indication can be given in NB-System Information, so that UE can be configured to stop receiving the channel/signal or start receiving and decoding the channel signal.

Figure 4:
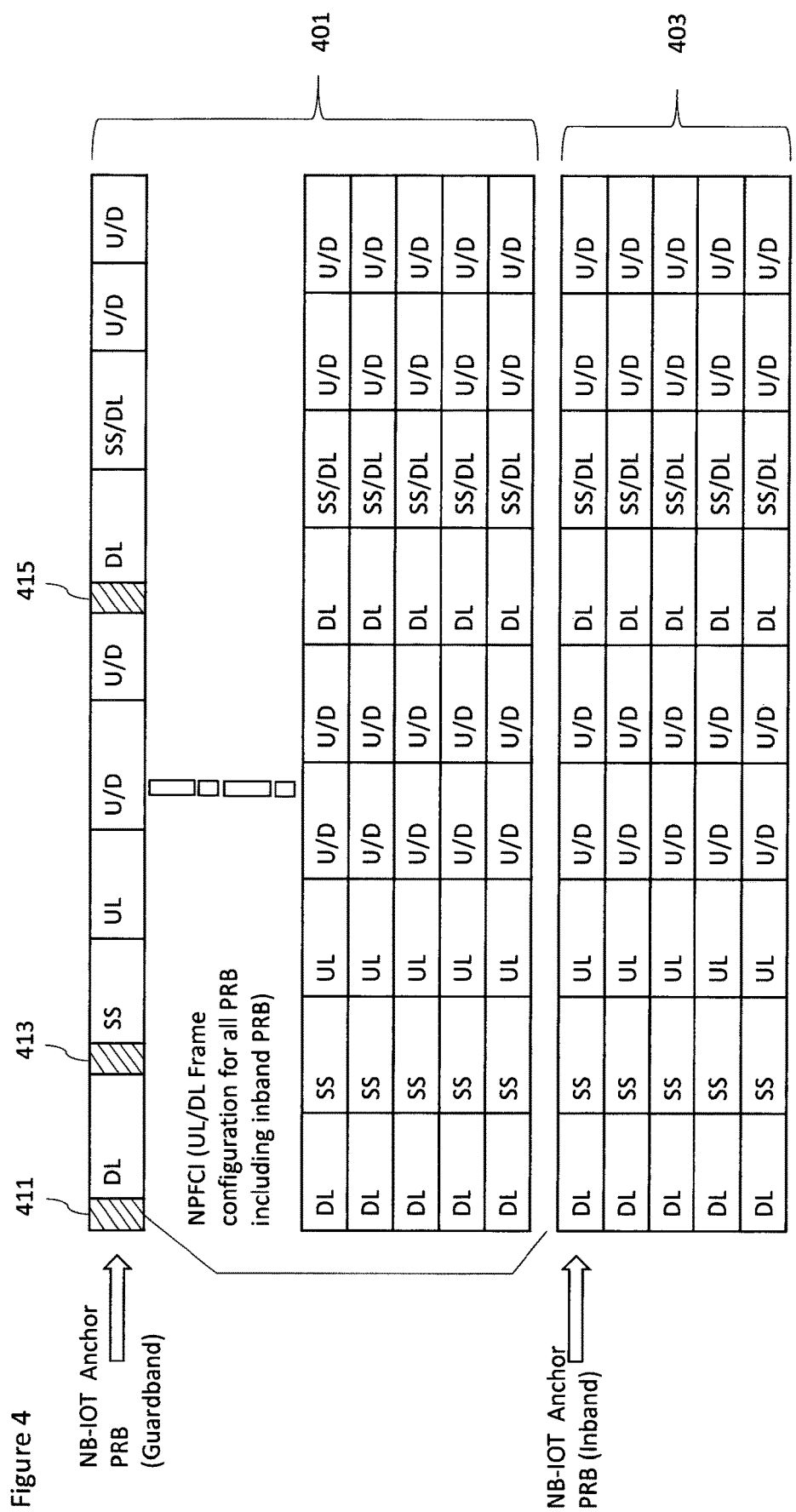
FIG. 4 shows an example resource block structure suitable for implementing signalling of dynamic switching of narrow band internet of things (NB-IoT) uplink/downlink (UL/DL) time division duplex (TDD) configurations according to some embodiments

One possible realisation of the proposed invention is illustrated in FIG. 4. FIG. 4 shows two NB-IOT TDD PRBs configured such that when NB-IoT TDD needs to be introduced in LTE cell which already have the dynamic TDD switching enabled, the two NB-IoT TDD PRBs shown are allocated one of the PRB 401 in the guard band and other NB-IoT PRB 403 in any of the inband PRB.

The NB-IoT PRB 401 on guard band is configured as an anchor PRB. On this PRB first ⅔ OFDM symbols of DL subframes can be used to carry new channel which will indicate the UL/DL configuration of the next window. This is shown in FIG. 4 by the block 411 on the first subframe (SF0) and the block 415 on the sixth subframe (SF5). Furthermore in some embodiments the same first ⅔ OFDM symbols of the special subframe, the second subframe (SF1) may also be used to carry the new channel as shown by block 413.

The block 411 and 415 may represent 3 bit information which indicates one of 6 possible UL/DL configurations of the radio frame (other than the configuration indicated in the system information). Although in the examples shown 3 bits are used to transfer the configuration information any suitable number of bits, for example 2 bits may be used in other embodiments. In some embodiments furthermore the access point is configured to generate and broadcast using a NB-system information channel/signal information representing a number of bits used as the indicator of the uplink and downlink configuration. This information may be received by the IoT UE and enable the IoT UE to receive and decode the correct number of bits.

Furthermore in some embodiments a parameter is broadcasted in the NB-System Information indicating a downlink signal strength threshold or defined signal strength. This threshold defines a signal strength level which may be used by the UE to determine whether the UE should refer to the new channel (NPFCI) or signal in order to know the UL/DL configuration. An UE which is in coverage condition (in other words receiving signals) below this given threshold will always use fixed UL and DL frames for its operation. This threshold may in some embodiments be determined based on the coverage performance evaluated for the new channel with number of repetitions possible within the periodicity of switching.

In some embodiments the NPFCI is a Zadoff-Chu (ZC) sequence of length 11 with two cyclic shifts. The ZC sequence may be mapped to the first 3 OFDM symbols in case of guard band anchor carrier. The cyclic shift applied on each of the symbol represents 1 bit information, thus 3 bit information is conveyed using ZC sequence sent in 3 OFDM symbols. In some embodiments when the ZC sequence is not present, it is indication that UL/DL configuration is same as the one indicated in the system information.

In some further embodiments a ZC sequence of length 22 or 33 can be used for the NPFCI which 6 cyclic shifts. This 22/33 bit sequence could be mapped to first ⅔ OFDM symbols.

With respect to FIG. 5 example NPFCI design for guard band deployment is shown. FIG. 5 shows the example NPFCI design within a DL subframe, such as SF0 511 and/or within a special subframe, such as SF1 513. In some embodiments the first OFDM symbol 501, 521 indicates the switching period. Furthermore the second OFDM and third OFDM symbols 503, 523 carry 2 bit information on UL/DL configuration applicable within the switching period.

Figure 6A:
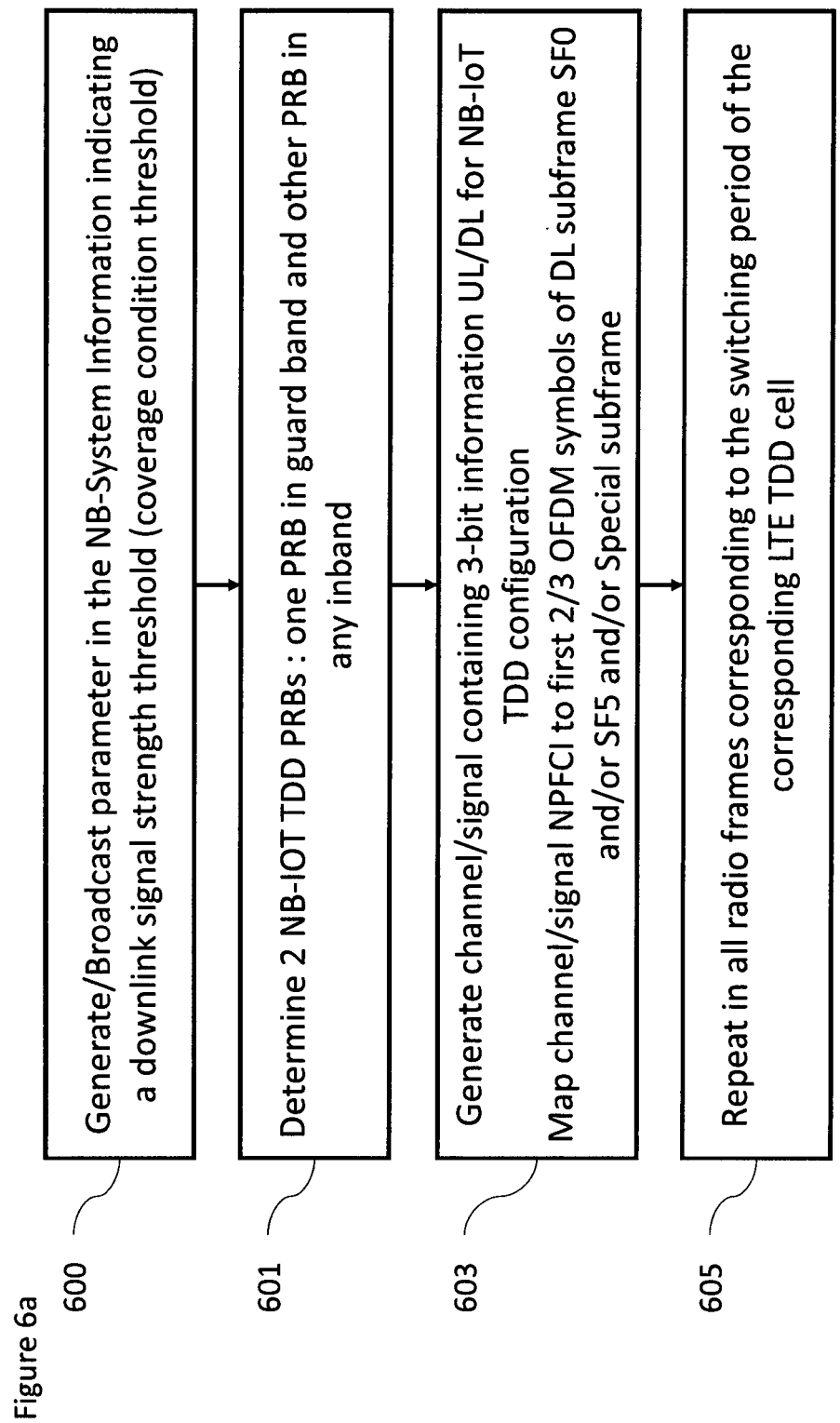
FIGS. 6a and 6b show flow diagrams of example methods for signalling of dynamic switching of narrow band internet of things (NB-IoT) uplink/downlink (UL/DL) time division duplex (TDD) configurations according to some embodiments.
Figure 6B:
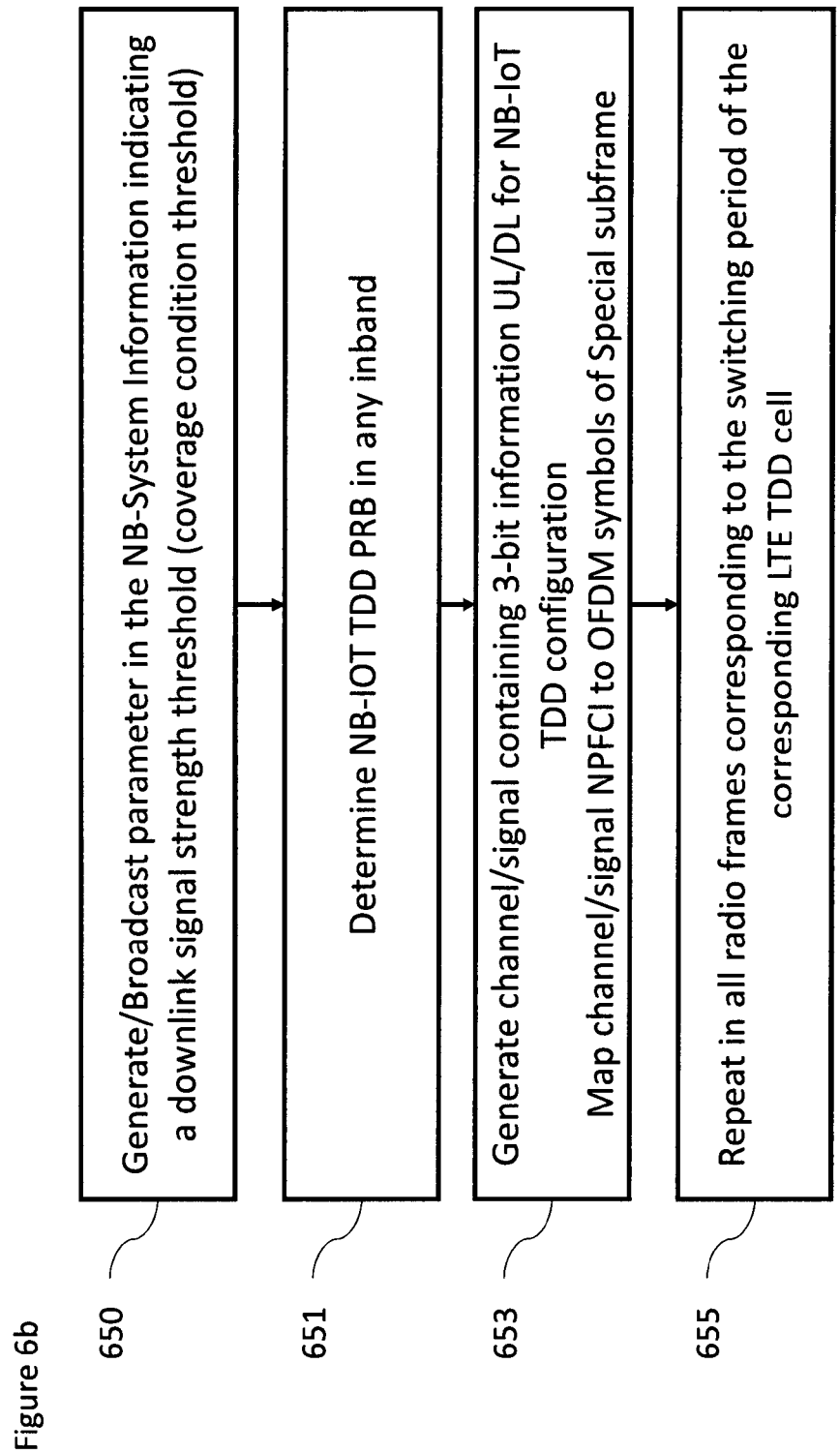

With respect to FIGS. 6a and 6b there are shown flow diagrams of example operations of methods 1 and 2 with respect to an access point.

With respect to FIG. 6a, which shows method 1, the first operation is one of generating and broadcasting a parameter in the NB system information indicating a downlink signal strength threshold.

The operation of generating and broadcasting a parameter in the NB system information indicating a signal strength threshold is shown in FIG. 6a by step 600.

The next operation is determining 2 NB-IOT TDD PRBs. One of the PRBs is in a guard band and the other PRB is in any inband.

The operation of determining the two NB-IOT TDD PRBs is shown in FIG. 6a by step 601.

The next operation is one of generating a channel/signal containing 3-bit information UL/DL for NB-IOT TDD configuration. This channel/signal may in some embodiments be defined as a N-Packet Frame Configuration Information (NPFCI) channel. The channel/signal may then be mapped to the first 2 or 3 symbols of the download DL subframes such as SF0 and/or SF5. Furthermore in some embodiments the channel/signal is mapped to a special subframe such as SF1.

The operation of generating a channel/signal containing 3-bit information UL/DL for NB-IOT TDD configuration and mapping the channel/signal to the DL subframes and/or special subframes in the first 2 or 3 symbols is shown in FIG. 6a by step 603.

The following operation is one of repeating the generating and mapping for all radio frames corresponding to the switching period of the corresponding LTE TDD cell.

The operation of repeating the generating and mapping for all radio frames corresponding to the switching period of the corresponding LTE TDD cell is shown in FIG. 6a by step 605.

With respect to FIG. 6b, which shows method 2, the first operation is one of generating and broadcasting a parameter in the NB system information indicating a downlink signal strength threshold.

The operation of generating and broadcasting a parameter in the NB system information indicating a signal strength threshold is shown in FIG. 6b by step 650.

The next operation is determining a NB-IOT TDD PRBs in any inband.

The operation of determining the NB-IOT TDD PRB is shown in FIG. 6b by step 651.

The next operation is one of generating a channel/signal containing 3-bit information UL/DL for NB-IOT TDD configuration. This channel/signal may in some embodiments be defined as a N-Packet Frame Configuration Information (NPFCI) channel. The channel/signal may then be mapped to OFDM symbols within the special subframe such as SF1.

The operation of generating a channel/signal containing 3-bit information UL/DL for NB-IOT TDD configuration and mapping the channel/signal to OFDM symbols within the special subframe is shown in FIG. 6b by step 653.

The following operation is one of repeating the generating and mapping for all radio frames corresponding to the switching period of the corresponding LTE TDD cell.

The operation of repeating the generating and mapping for all radio frames corresponding to the switching period of the corresponding LTE TDD cell is shown in FIG. 6b by step 655.

Figure 7A:
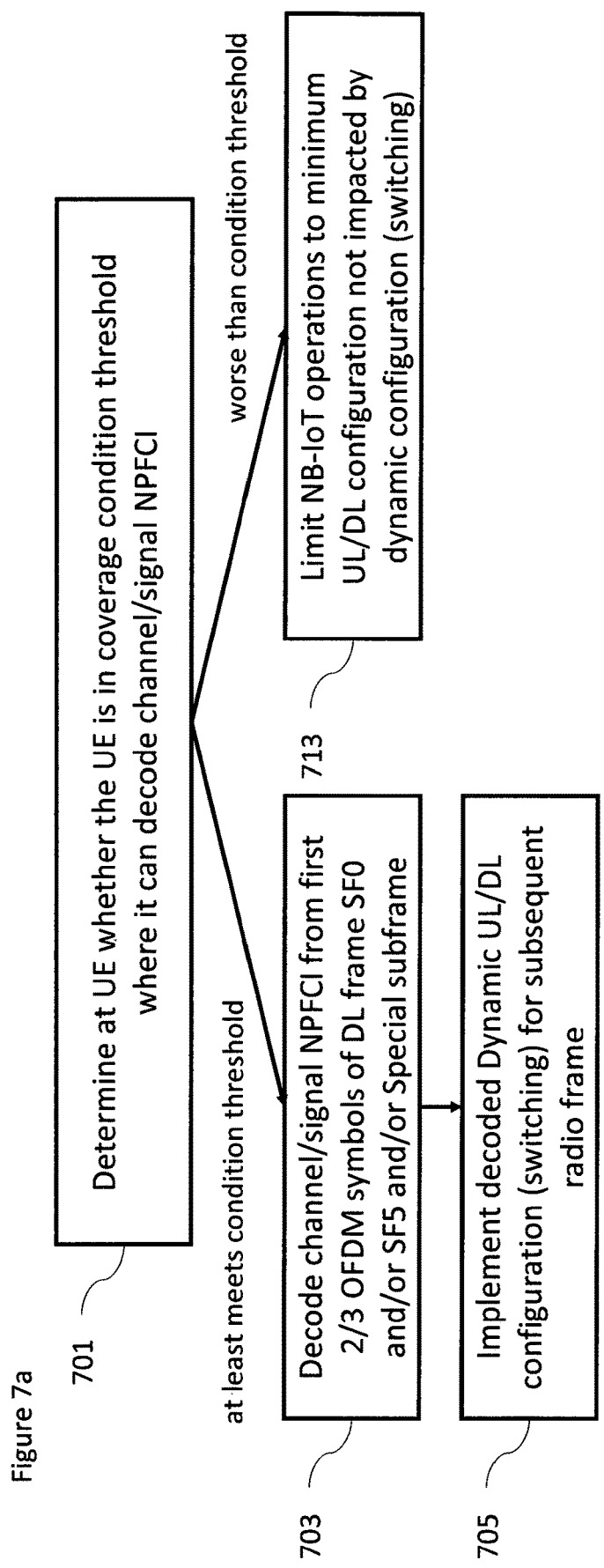
FIGS. 7a and 7b show flow diagrams of example methods for determining signalling of dynamic switching of narrow band internet of things (NB-IoT) uplink/downlink (UL/DL) time division duplex (TDD) configurations according to some embodiments.
Figure 7B:
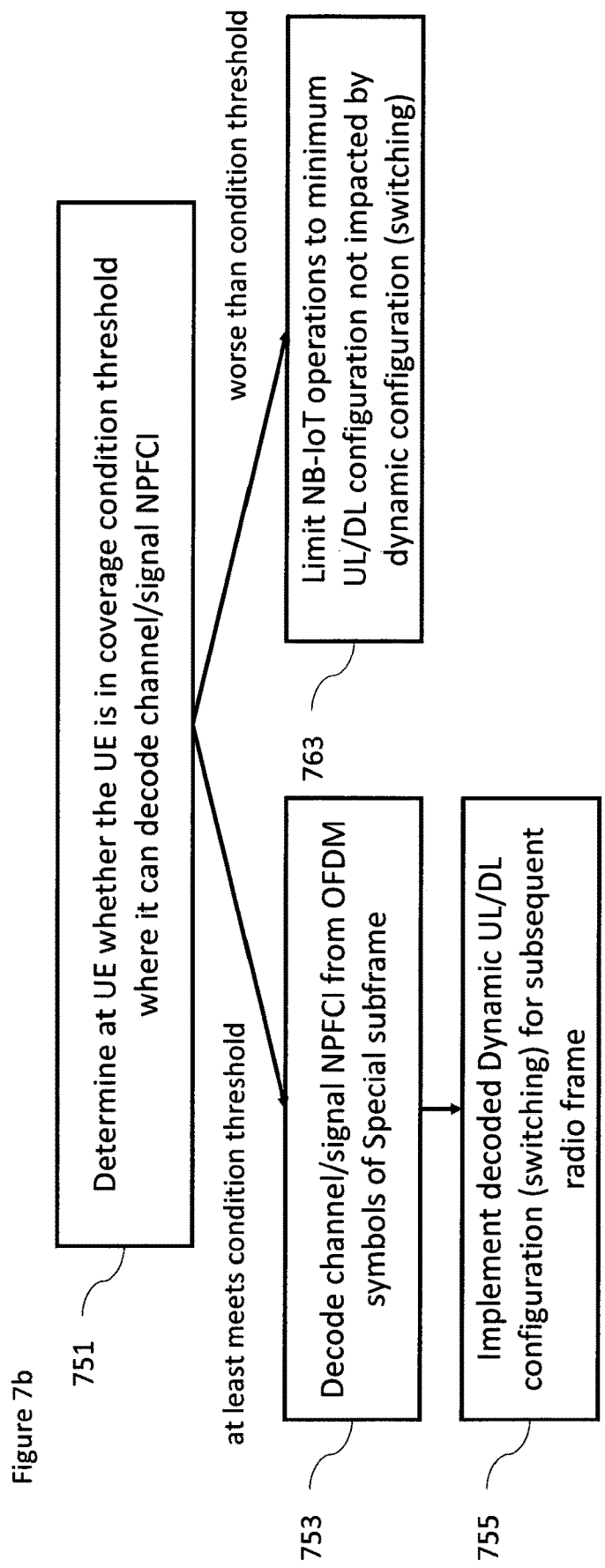

With respect to FIGS. 7a and 7b there are shown flow diagrams of example operations of methods 1 and 2 with respect to an IoT user equipment.

With respect to FIG. 7a, which shows method 1, the first operation is one of determining at the UE whether the UE is within the coverage condition threshold value (based on the parameter in the NB system information indicating a downlink signal strength threshold and a determination of the current received signal strength).

The operation of determining whether the UE is within the coverage condition threshold value is shown in FIG. 7a by step 701.

Where the UE at least meets the coverage condition threshold the next operation may be one of decoding the channel/signal (NPFCI) from the first 2 or 3 symbols of the download DL subframes such as SF0 and/or SF5 and/or the special subframe such as SF1. Having decoded the channel/signal the 3-bit information UL/DL for NB-IoT TDD configuration may then be decoded.

The operation of decoding the channel/signal (NPFCI) and extracting the 3-bit information UL/DL for NB-IoT TDD configuration is shown in FIG. 7a by step 703.

The next operation is one of implementing the decoded UL/DL for NB-IOT TDD configuration for the subsequent radio frame.

The operation of implementing the decoded UL/DL for NB-IOT TDD configuration for the subsequent radio frame is shown in FIG. 7a by step 705.

In some embodiments the UE may be configured to determine the presence or absence of the channel/signal (before decoding the channel/signal). Where there is the presence of the channel/signal this presence indicates that there is a change in the uplink and downlink configuration since the earlier NB system information UL/DL configuration indication or information and the UE may decode the changed UL/DL NB-IoT TDD configuration (which is the same as the UL/DL TDD configuration for the co-located LTE system).

Furthermore in such embodiments the absence of the channel/signal may be used by the UE to determine that there is no change in the uplink and downlink configuration since the earlier NB system information.

Where the UE is in a coverage condition worse than the coverage condition threshold the next operation may be one of limiting the NB-IoT operations to the minimum UL/DL configuration not impacted by the dynamic configuration (switching).

The operation of limiting the NB-IoT operations to the minimum UL/DL configuration not impacted by the dynamic configuration (switching) is shown in FIG. 7a by step 713.

With respect to FIG. 7b, which shows method 2, the first operation is one of determining at the UE whether the UE is within the coverage condition threshold value (based on the parameter in the NB system information indicating a downlink signal strength threshold and a determination of the current received signal strength).

The operation of determining whether the UE is within the coverage condition threshold value is shown in FIG. 7b by step 751.

Where the UE at least meets the coverage condition threshold the next operation may be one of decoding the channel/signal (NPFCI) from the special subframe. Having decoded the channel/signal the 3-bit information UL/DL for NB-IoT TDD configuration may then be decoded.

The operation of decoding the channel/signal (NPFCI) and extracting the 3-bit information UL/DL for NB-IoT TDD configuration is shown in FIG. 7b by step 753.

The next operation is one of implementing the decoded UL/DL for NB-IoT TDD configuration for the subsequent radio frame.

The operation of implementing the decoded UL/DL for NB-IoT TDD configuration for the subsequent radio frame is shown in FIG. 7b by step 755.

Where the UE is in a coverage condition worse than the coverage condition threshold the next operation may be one of limiting the NB-IoT operations to the minimum UL/DL configuration not impacted by the dynamic configuration (switching).

The operation of limiting the NB-IoT operations to the minimum UL/DL configuration not impacted by the dynamic configuration (switching) is shown in FIG. 7b by step 763.

Figure 8:
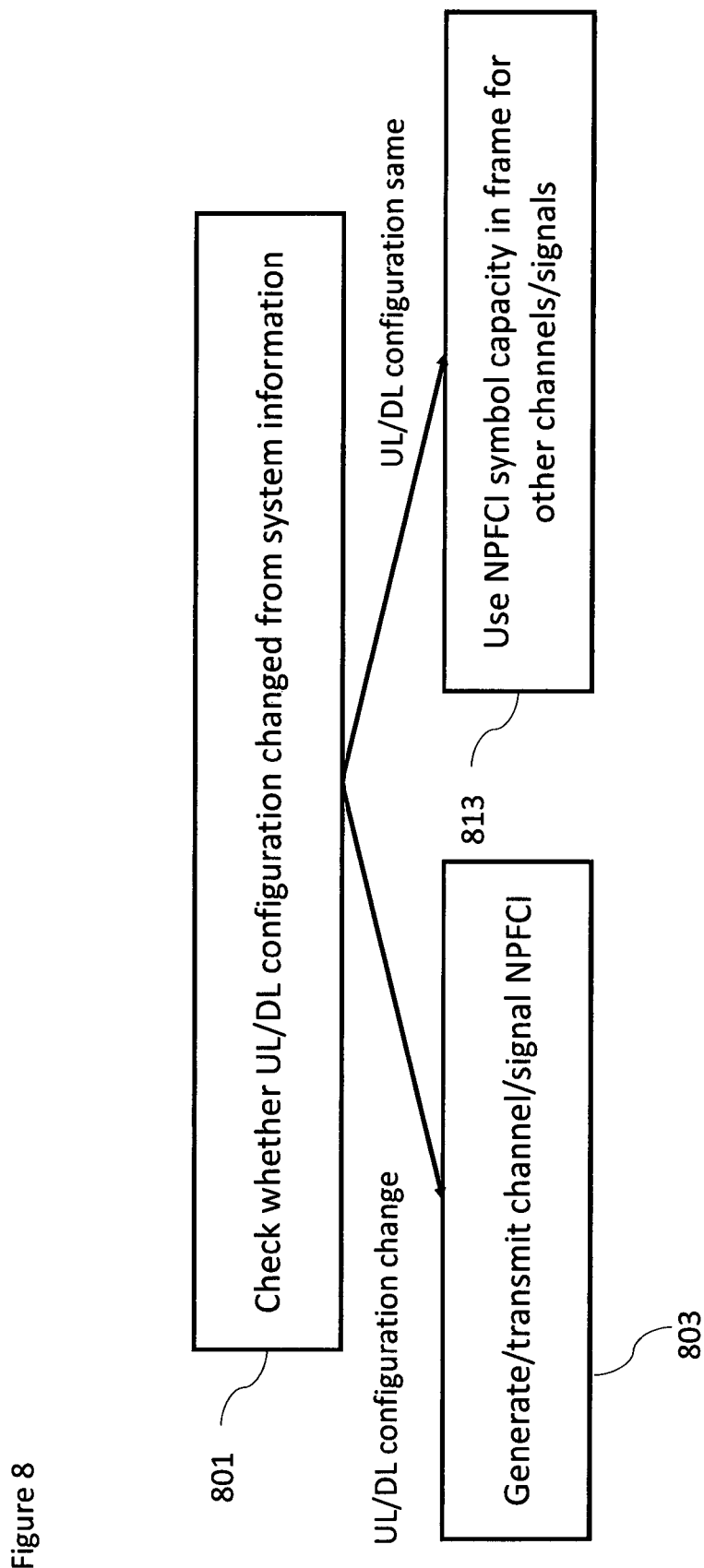
FIG. 8 shows a flow diagram of a further aspect of signalling of dynamic switching according to some embodiments.

With respect to FIG. 8 a flow diagram of a further aspect of signalling of dynamic switching according to some embodiments is shown. Specifically FIG. 8 shows an optional aspect implemented in some embodiments wherein the access point is configured to check whether the UL/DL configuration has changed from the UL/DL configuration indicated by the system information.

The operation of checking whether the UL/DL configuration has changed from the UL/DL configuration indicated by the system information is shown in FIG. 8 by step 801.

In some embodiments where the UL/DL configuration has changed from the UL/DL configuration indicated by the system information then the access point is configured to generate and transmit the channel/signal NPFCI such as shown in FIGS. 6a and 6b and as described above.

The operation of generating and transmitting the channel/signal NPFCI based on determining that the UL/DL configuration has changed is shown in FIG. 8 by step 803.

In some embodiments where the UL/DL configuration has not changed from the UL/DL configuration indicated by the system information then the access point is configured to use the channel/signal NPFCI capacity in the frame for other channels/signals.

The operation of using the channel/signal NPFCI capacity in the frame for other channels/signals based on determining that the UL/DL configuration has not changed is shown in FIG. 8 by step 805.

Furthermore with respect to FIG. 9 a flow diagram of another aspect of signalling of dynamic switching according to some embodiments is shown. Specifically FIG. 9 shows an optional aspect implemented in some embodiments wherein the access point is configured to generate and transmit from the access point an indicator in the NB system information indicating whether the eIMTA feature is enabled or disabled in LTE.

The operation of generating and transmitting from the access point an indicator in the NB system information indicating whether the eIMTA feature is enabled or disabled in LTE is shown in FIG. 9 by step 901.

The following operation is performed at the UE wherein the UE is configured to receive the indicator in the NB system information broadcast. Based on the indicator value the UE may then be configured to determine whether to watch for the NPFCI channel/signal.

The operation of receiving the indicator in the NB system information broadcast and based on the indicator value determining whether to watch for the NPFCI channel/signal is shown in FIG. 9 by step 903.

As such when implementing embodiments as described above which proposes mechanism for interworking of dynamic switching feature of LTE TDD with NB-IoT TDD, when NB-IOT TDD is deployed as inband/guardband mode with LTE TDD there may be several advantages.

With the proposed invention NB-IoT TDD can be introduced as inband with LTE without impacting the dynamic switching functionality at LTE. With dynamic switching enabled at NB-IoT, the resource reconfiguration at NB-IoT is also possible according to the loading condition. Awareness of the UL/DL configuration of radio frame on frame level will be beneficial for NB-IoT devices in normal coverage to adapt the resource usage effectively.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method for configuring an access node to operate within a time division duplex communications system between the access node and at least one user equipment wherein the time division duplex communications system is a narrowband internet of things time division duplex communications system co-located with a long term evolution communications system network configured to switch uplink and downlink configurations from frame to frame, the method comprising:
   generating a channel/signal, the channel/signal comprising information of a uplink and downlink configuration for communication between the access node and the at least one user equipment;
   mapping the channel/signal to at least one subframe period;
   defining a physical resource block deployed in a guard band of the time division duplex communications system, the physical resource block deployed in the guard band having a respective plurality of orthogonal frequency division multiplexed symbols of a downlink subframe, a first two-thirds of the plurality of orthogonal frequency division multiplexed symbols being configured to carry the channel/signal; and
   transmitting the channel/signal to the at least one user equipment during the at least one subframe period, such that the channel/signal is received and used by the at least one user equipment to set the uplink and downlink configuration for communication between the access node and the at least one user equipment.

2. The method as claimed in claim 1, further comprising:
   defining at least one additional physical resource blocks, the physical resource block deployed in the guard band of the time division duplex communications system and the at least one additional physical resource blocks deployed in an inband of the time division duplex communications system, wherein transmitting the channel/signal to the at least one user equipment during the at least one subframe period comprises transmitting the channel/signal to the at least one user equipment during the at least one subframe period repeated over the physical resource block deployed in the guard band.

3. The method as claimed in claim 1, further comprising:
   defining a physical resource block deployed in a guard band of the time division duplex communications system, wherein transmitting the channel/signal to the at least one user equipment during the at least one subframe period comprises transmitting the channel/signal to the at least one user equipment during the at least one subframe period repeated over the physical resource blocks deployed in the guard band.

4. The method as claimed in claim 2, wherein mapping the channel/signal to at least one subframe period comprises at least one of:
   mapping the channel/signal to a first two orthogonal frequency division multiplexed symbols of a downlink subframe within a frame;
   mapping the channel/signal to a first three orthogonal frequency division multiplexed symbols of a downlink subframe within a frame;
   mapping the channel/signal to a first two orthogonal frequency division multiplexed symbols of a first special subframe within a frame; and
   mapping the channel/signal to a first three orthogonal frequency division multiplexed symbols of a first special subframe within a frame.

5. The method as claimed in claim 1, further comprising:
   defining a physical resource block deployed in an inband of the time division duplex communications system, wherein transmitting the channel/signal to the at least one user equipment during the at least one subframe period comprises transmitting the channel/signal to the at least one user equipment during the at least one subframe period repeated over the physical resource block deployed in the inband.

6. The method as claimed in claim 5, wherein mapping the channel/signal to at least one subframe period comprises at least one of:
   mapping the channel/signal to a third and fourth orthogonal frequency division multiplexed symbols of a downlink pilot timeslot in a first special subframe; and
   mapping the channel/signal to a third to fifth orthogonal frequency division multiplexed symbols of a downlink pilot timeslot in a first special subframe.

7. The method as claimed in claim 1, further comprising generating and broadcasting using a narrow band system information channel/signal information representing a signal condition threshold.

8. The method as claimed in claim 1, further comprising generating and broadcasting using a narrow band system information channel/signal information representing whether an Enhanced Interference Mitigation & Traffic Adaptation mode is enabled in the long term evolution communications system network.

9. The method as claimed in claim 1, wherein generating a channel/signal, the channel/signal comprising information of an uplink and downlink configuration for communication between the access node and the at least one user equipment comprises defining one of:
   a three bit indicator of the uplink and downlink configuration; and
   a two bit indicator of the uplink and downlink configuration.

10. The method as claimed in claim 1, further comprising generating and broadcasting using a narrow band system information channel/signal information representing a number of bits used as an indicator of the uplink and downlink configuration.

11. The method as claimed in claim 1, wherein mapping the channel/signal to at least one subframe period comprises one of
   generating a Zadoff-Chu sequence of length 11 with two cyclic shifts to OFDM symbols, wherein a cyclic shift applied on each symbol represents 1 bit information; and
   generating a Zadoff-Chu sequence of length 22 or 33 with 6 cyclic shifts to OFDM symbols.

12. The method of claim 1, comprising:
- determining that the uplink and downlink configuration for communication between the access node and the at least one user equipment has changed since an earlier configuration broadcast using a narrow band system information channel/signal; and
- allocating the capacity of the channel/signal to at least one other channel/signal where the uplink and downlink configuration for communication between the access node and the at least one user equipment has not changed.

13. A method for configuring a user equipment to operate within a time division duplex communications system between an access node and the user equipment wherein the time division duplex communications system is a narrowband internet of things time division duplex communications system co-located with a long term evolution communications system network configured to switch uplink and downlink configurations from frame to frame, the method comprising:
- receiving a channel/signal from the access node during at least one defined subframe period, the channel/signal comprising information of a uplink and downlink configuration for communication between the access node and the user equipment;
- configuring the user equipment using the information of a uplink and downlink configuration for communication between the access node and the user equipment to set the uplink and downlink configuration for communication between the access node and the at least one user equipment,
- wherein a physical resource block is deployed in a guard band of the time division duplex communications system, the physical resource block deployed in the guard band having a respective plurality of orthogonal frequency division multiplexed symbols of a downlink subframe, a first two-thirds of the plurality of orthogonal frequency division multiplexed symbols being configured to carry the channel/signal.

14. The method as claimed in claim 13, wherein at least one additional physical resource blocks is deployed in an inband of the time division duplex communications system, the physical resource block deployed in the guard band of the time division duplex communications system, wherein transmitting the channel/signal to the at least one user equipment during the at least one subframe period comprises transmitting the channel/signal to the at least one user equipment during the at least one subframe period repeated over the physical resource block deployed in the guard band.

15. The method as claimed in claim 13, wherein a physical resource block is deployed in the guard band of the time division duplex communications system, wherein receiving a channel/signal from the access node during at least one defined subframe period further comprises receiving a channel/signal from the access node during at least one defined subframe period repeated over the one of the at least two physical resource blocks being deployed in the guard band.

16. The method as claimed in claim 14, wherein receiving a channel/signal from the access node during at least one defined subframe period comprises at least one of:
- receiving the channel/signal in a first two orthogonal frequency division multiplexed symbols of a downlink subframe within a frame;
- receiving the channel/signal in a first three orthogonal frequency division multiplexed symbols of a downlink subframe within a frame;
- receiving the channel/signal in a first two orthogonal frequency division multiplexed symbols of a first special subframe within a frame; and
- receiving the channel/signal in a first three orthogonal frequency division multiplexed symbols of a first special subframe within a frame.

17. The method as claimed in claim 13, further comprising:
- defining a physical resource block deployed in an inband of the time division duplex communications system, wherein receiving the channel/signal to the at least one user equipment during the at least one subframe period comprises receiving the channel/signal to the at least one user equipment during the at least one subframe period repeated over the physical resource block deployed in the inband.

18. The method as claimed in claim 17, wherein receiving a channel/signal from the access node during at least one defined subframe period comprises at least one of:
- receiving the channel/signal in a third and fourth orthogonal frequency division multiplexed symbols of a downlink pilot timeslot in a first special subframe; and
- receiving the channel/signal to a third to fifth orthogonal frequency division multiplexed symbols of a downlink pilot timeslot in a first special subframe.

19. The method as claimed in claim 13, wherein receiving a channel/signal from the access node during at least one defined subframe period comprises decoding from the channel/signal one of:
- a two bit indicator of the uplink and downlink configuration; or
- a three bit indicator of the uplink and downlink configuration.

20. The method as claimed in claim 13, further comprising receiving a narrow band system information channel/signal information representing a number of bits used as an indicator of the uplink and downlink configuration.

* * * * *